Feb. 4, 1969     F. D. GRIFFIN     3,426,272
DEVICE FOR DETERMINING THE ACCURACY OF
THE FLARE ON A FLARED TUBE
Filed June 17, 1966     Sheet _1_ of 2

INVENTOR.
FRANCIS D. GRIFFIN
BY James O. Harrell
        G. H. McCoy
              ATTORNEYS

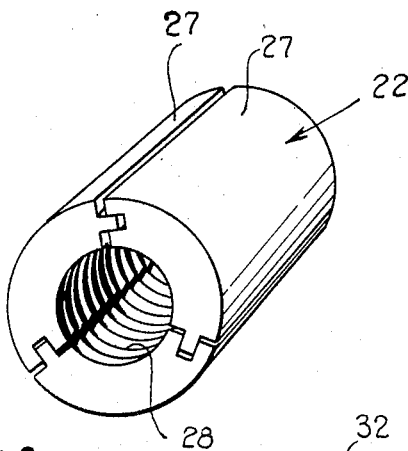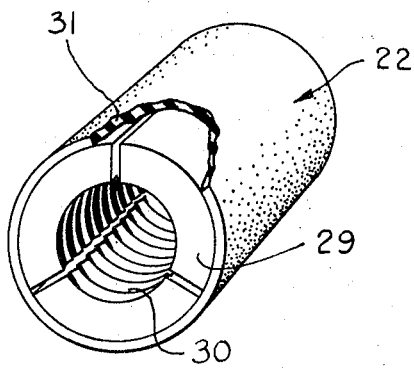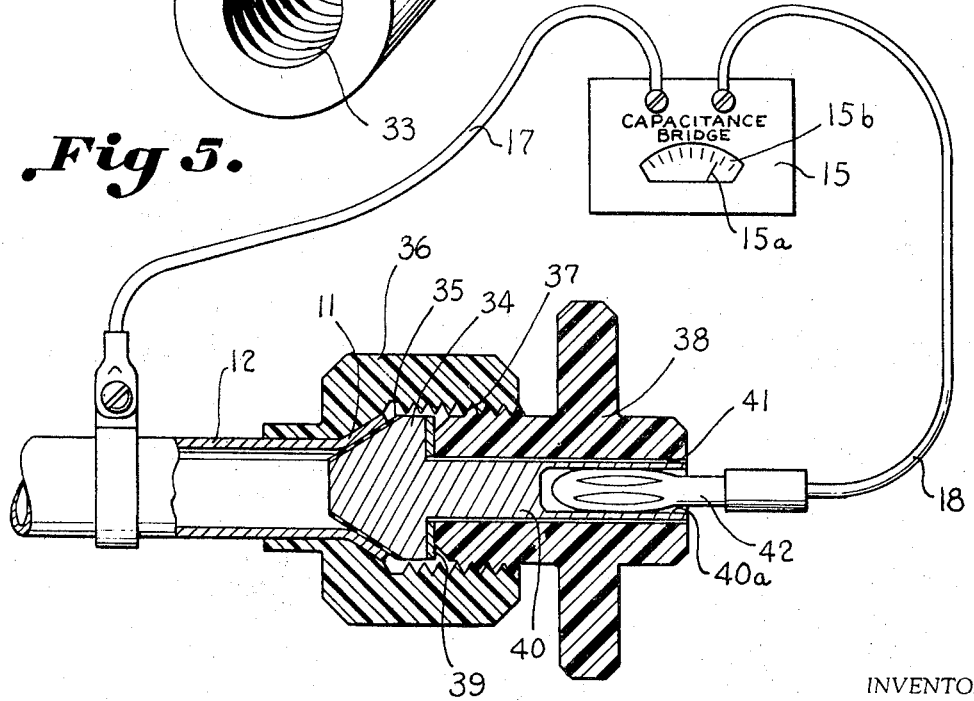

United States Patent Office 3,426,272
Patented Feb. 4, 1969

3,426,272
DEVICE FOR DETERMINING THE ACCURACY OF THE FLARE ON A FLARED TUBE
Francis D. Griffin, Merritt Island, Fla., assignor to the United States of America as represented by the Administrator of the National Aeronautics and Space Administration
Filed June 17, 1966, Ser. No. 559,351
U.S. Cl. 324—61                                4 Claims
Int. Cl. G01r 27/26; G01n 27/22

ABSTRACT OF THE DISCLOSURE

A device with a cone-shaped portion that fits into the flare of a flared tube. Means are provided for measuring the capacitance between the tube and the cone-shaped portion. This capacitance measurement is an indication of the accuracy and uniformity of the flare.

---

Figure 1:
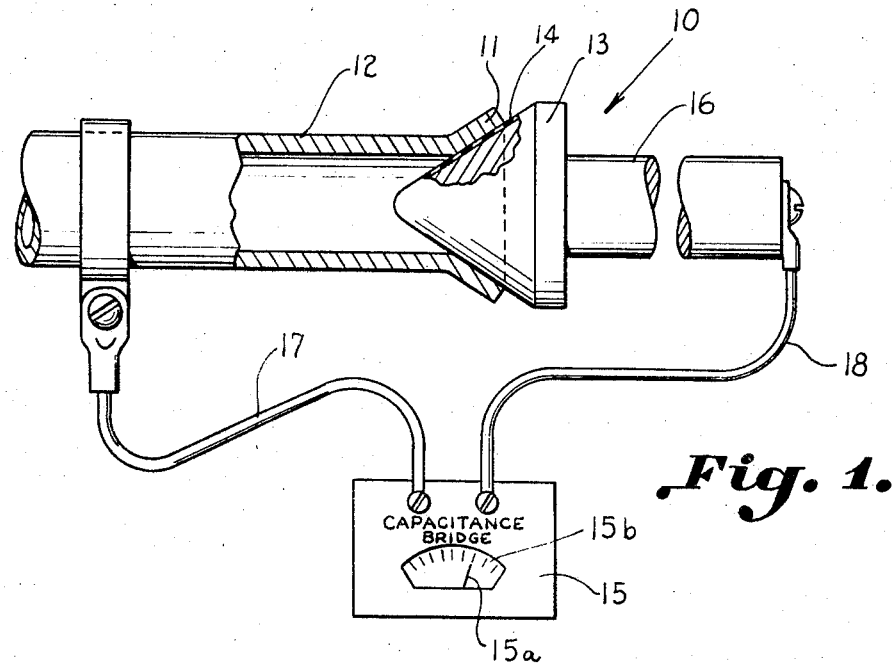

The invention described herein was made by an employee of the United States Government, and may be manufactured and used by or for the Government for governmental purposes without the payment of any royalties thereon or therefor.

The present invention relates generally to a device for checking a flare on a tube against imperfections, and more particularly to a device which will electrically determine the accuracy of a flare on a tube.

Imperfections in the flare of a tube may be produced in the forming of the flare or, such may be produced by mishandling of the tube after the flare has been placed thereon. Heretofore, the accuracy of the flare of a tube has depended on sample checking with instruments that require a great deal of time, supplemented with visual inspection of each flare. As a result of this method, imperfections in the flare are often overlooked. While in some systems where flared tubes are utilized, minor imperfections of the flare do not adversely affect the operation of the system in which it is connected, however, where flared tubing is utilized in pneumatic and hydraulic systems and large pressures are developed, imperfections in the flare of the tube will often cause leakage in the system. Repairing such leakages is often expensive and time consuming, especially when the tubing is located in inaccessible areas.

Many flared tube connections are utilized in missile systems for transporting the fuel for the missile, as well as other fluids throughout the missile. Such connections are often subjected to high pressures and during the flight of the missile the pressure externally of the fitting may vary from atmospheric pressure to a near vacuum when the missile is in orbit. If a leak develops in any of the fittings prior to launching of the missile, such would delay the lift-off for a considerable period of time until adequate repairs are made. Accordingly, if a leak develops while the missile is in flight, such could jeopardize the entire flight of the missle and the lives of the astronauts being carried by the missile. Thus, it can be seen that it is extremely important that leak free couplings be utilized in lines where fluids are being transported.

It has been found that the foregoing difficulties and disadvantages presented by visually inspecting flared tubing may be overcome. In accordance with the present invention, a novel apparatus is provided for testing a flared tube for determining the accuracy and uniformity of the flare on the tube. This apparatus contemplates inclusion of the following parts: (1) A cone shaped member constructed of electrically conductive material, (2) the cone shaped member having a tapering surface which is the complement of the desired flare of the tube, (3) a uniform, thin layer of dielectric material carried on the surface of the cone shaped member, (4) the surface of the cone shaped member being positioned in mating relation with the flare of the tube, (5) a meter for measuring the capacitance between the cone shaped member and the flare, and (6) one side of the meter being electrically connected to the cone shaped member and the other side of the meter being connected to the tube, whereby the capacitance measurement produced by the meter is indicative of the accuracy and uniformity of the flare on the tube.

Accordingly, it is an object of this invention to provide an apparatus for testing a flared tube for determining the accuracy and uniformity of the flare on the tube.

Another object of the present invention is to provide an electric meter employing a capacitance bridge circuit for measuring variations between a flare of a tube and a member having a tapering surface which is the complement of the desired flare on the tube.

A further object of the present invention is to provide an apparatus for determining the accuracy and uniformity of a flare on a tube utilizing a cone shaped member which is applied under uniform pressure in mating relation with the flare and measuring the capacitance between the cone shaped member and the flare for detecting imperfections in the flare.

Figure 2:
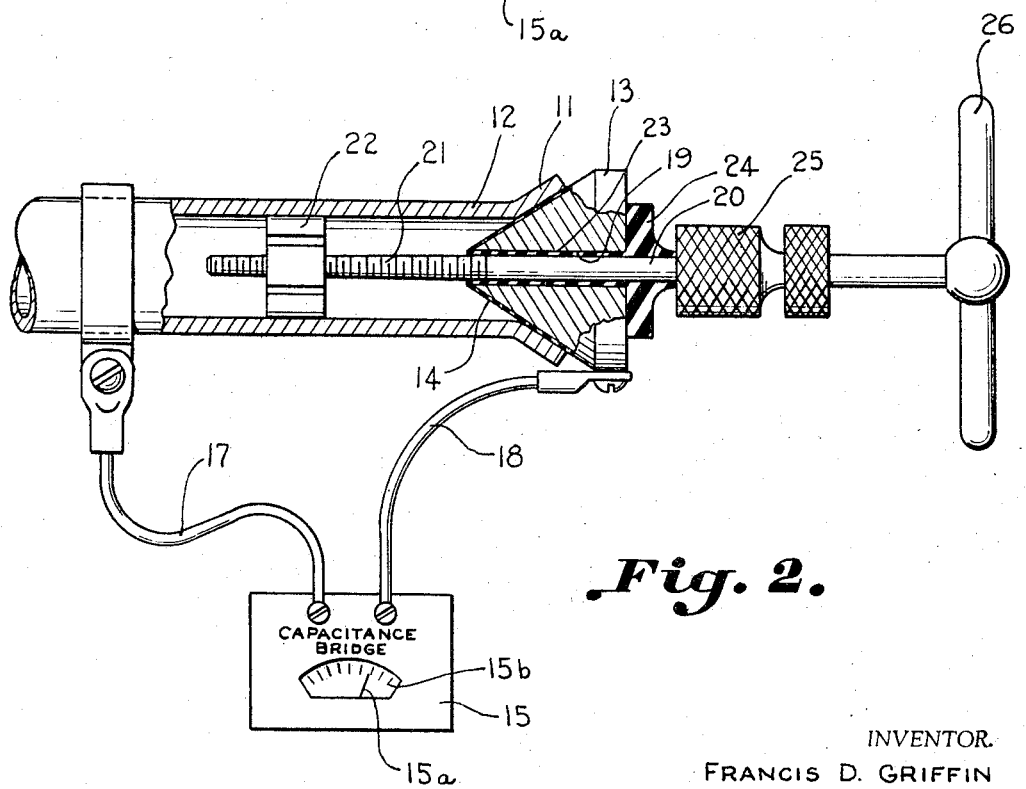

Other objects and advantages of this invention will become more apparent from a reading of the following detailed description and appended claims taken in conjunction with the accompanying drawings wherein:

FIGURE 1 is a side elevational view, partially in section, of an apparatus constructed in accordance with the present invention for detecting imperfections in the flare of a tube, FIGURE 2 is a side elevational view, partially in section, of a modified form of the invention, FIGURE 3 is an enlarged perspective view of an expansion bit utilized in the modified form of the invention illustrated in FIGURE 2, FIGURE 4 is an enlarged perspective view, partially in section, of another expansion bit which may be utilized in the modified form of the invention illustrated in FIGURE 2, FIGURE 5 is an enlarged perspective view of still another expansion bit which may be utilized in the modified form of the invention illustrated in FIGURE 2, and FIGURE 6 is a longitudinal sectional view illustrating another modified form of the invention.

Referring now in more detail to the drawings wherein like reference numerals designate identical or corresponding parts throughout the several views, and with special attention to FIGURE 1, reference numeral 10 generally designates an apparatus for testing the accuracy and uniformity of a flare 11 on a tube 12. The flare 11 on the tube 12 has been produced by any conventional flaring device, and prior to placing the tube in a system where it is ultimately to be used, it is desired to check the flare 11 against imperfections, such as the angle of the flare deviating from the desired angle of the flare. The apparatus includes a cone shaped member 13 constructed of an electrically conductive material and having a tapering surface which is the complement of the desired flare of the tube. A uniform, thin layer of dielectric material 14 is carried on the surface of the cone shaped member for insulating the electrically conductive cone 13 from the electrically conductive flare 11. The surface of the cone shaped member 13 is positioned in mating relation with the flare 11 of the tube.

In order to determine whether there are any imperfections in the flare 11 a meter 15, which includes a capacitance bridge, is connected between the tube 12 and an elongated conductive member 16 which is integral with the base of the cone 13. The connection may be made by any suitable means, such as by leads 17 and 18, respectively. The meter 15 has an indicator arm 15a thereon, which will point to indicia 15b carried on the face of the meter providing a reading of capacitance. This reading is compared with the capacitance produced when testing a tube constituting a standard of perfection. If disparity in the readings or values is beyond that required by acceptable tolerances, then the tube will be rejectd. The capacitance measurement produced by the meter 15 is indicative of the accuracy and uniformity of the flare. For example, the capacitance will vary according to the closeness of the fit of the cone in the flare 11, according to the formula $$C = .2248 K \frac{A}{D} \mu\mu f$$

wherein A is the area in square inches of the flare inside the tube, K the dielectric constant of the insulation 14 and a conversion factor permitting inches to be used in the formula, D is the gap in inches between the metal portion of the cone 13 and the surface of the flare created by the cone insulation and the space where the flare does not fit flush with the cone, and $\mu\mu f$. represents micro-microfarads. Thus, it can be seen, if the flare has any imperfections therein, the measurement produced on the capacitor bridge meter 15 will vary from that of a previously calculated perfect flare. It can also be seen from the formula that the capacitance will decrease as the fit of the cone 13 within the flare 11 becomes less flush due to an increase in D. Accordingly, as previously mentioned, if such variance is beyond a given tolerance, the tube will be rejected and the flared portion then be cut off and the tube be retooled.

FIGURE 2 illustrates a modified form of the invention wherein a uniform pressure can be applied between the surface of the cone 13 and the flare 11. The cone 13 is provided with a longitudinal aperture 19. A shaft 20 extends through the longitudinal aperture 19 of the cone and terminates in the tube 12. The end of the shaft 20, which is located within the tube 12, has tapering threads 21 thereon, which taper from the end of the shaft outwardly towards the cone 13. An abutment 22, such as an expansion bit, is carried by the elongated shaft 20 for engaging the inner wall of the tube when the shaft is rotated. Threads are carried by said abutment 22 complementary to the threaded shaft, whereby turning of the threaded shaft in a clockwise direction results in the expansion bit riding up on the tapering threads 21 until the bit expands to engage the wall of the tube 12 providing a fixed connection between the shaft 20 and the wall of the tube 12. An insulated bushing 23 extends through the aperture 19 in the cone 13 for supporting the shaft 20, and has a flared portion 24 which may be rotated and which engages the base of the cone 13. If desired, the bushing 23 may be fixed to the shaft 20 so that as the shaft rotates and the expansion bit engages the inner wall of the tube 12 such will pull the cone flush against the flare 11 of the tube. However, in the embodiment illustrated in FIGURE 2 the bushing is connected through a torque wrench 25 carried on the end of the shaft 20. The torque wrench 25 may be any suitable conventional torque wrench wherein a desired amount of torque may be applied to the shaft 20 and after it reaches that amount the wrench will slip on the shaft. A handle 26 is provided on the end of the torque wrench 25 for rotating such. By utilizing a torque wrench the same amount of pressure can be applied between the cone 13 and the flares of a plurality of tubes being tested so that consistent measurements may be made by the apparatus.

The meter 15 for measuring the capacitance between the cone 13 and the flare 11 is similar to that illustrated in FIGURE 1 and the connections are the same with the exception that lead 18 is connected directly to the cone 13.

FIGURES 3, 4 and 5 illustrate three suitable expansion bits that may be used with the modified form of the invention illustrated in FIGURE 2. The expansion bit illustrated in FIGURE 3 generally designated at 22 includes a plurality of circumferentially spaced, tongue and groove connected, arcuately shaped sections 27. The inner surfaces of the sections 27 have threads 28 thereon for meshing with the threads on the elongated shaft 20. Thus, it can be seen that as the shaft 20 is rotated in a clockwise direction the expansion bit will ride up on the tapering threads 21 expanding for engaging the inner wall of the tube 12.

The expansion bit illustrated in FIGURE 4 includes a plurality of circumferentially spaced, arcuately shaped sections 29. The inner surface of the sections have threads 30 thereon, for meshing with the threads 21 on the elongated shaft 20. A cylindrical flexible jacket constructed of any suitable material, such as rubber, encompasses the sections 29 for engaging the inner wall of the tube 12. Such may be utilized when the flare on a soft metal type tube is being tested for imperfections so as to prevent scarring of the tube.

FIGURE 5 illustrates another modified form of a bit, generally designated at 22, which may be utilized in connection with the apparatus illustrated in FIGURE 2. The bit is cylindrical in shape and is split at 32 so that such can expand as the shaft 20 is rotated. The bit is constructed of any suitable flexible metal so that such will tend to contract. However, as the shaft 20 is rotated it is permitted to expand for engaging the inner wall of the tube 12. The inner surface of the cylindrical bit 22, illustrated in FIGURE 5, has threads 33 thereon, for meshing with the threads on the elongated shaft 20.

When utilizing the apparatus illustrated in FIGURE 2 for testing against imperfections in the flare 11 of the tube, the expansion bit 22 is first threaded on the shaft 20 so that there is a relatively tight fit between the expansion bit and the inner wall of the tube 12 when the apparatus is inserted in the tube 12. Such prevents the expansion bit from rotating as the shaft is rotated when applying a desired amount of torque on the cone shaped member 13.

FIGURE 6 illustrates another modified form of the invention wherein a constant pressure is applied during the testing of the flare. A frusto conical shaped member 34 is placed in mating relation with the flare 11 of the tube 12. The frusto conical shaped member 34 has a uniform layer of dielectric material 35 thereon for insulating the electrically conductive member 34 from the flare 11. A non-conductive nut 36 is carried on the tube 12, and has a threaded portion 37 extending longitudinally beyond the flare 11 of the tube 12. A non-conductive threaded union 38 is threaded in the nut 36. A bearing washer 39 is carried adjacent the base of the member 34. The frusto conical shaped member 34 has a longitudinally extending conductive member 40 integral with the base thereof, which extends through a cylindrical aperture 41 of the union 38. The longitudinally extending member 40 has an aperture 40a therein for receiving an electrically conductive expansion plug 42 which is electrically connected to the lead 18 from one side of the meter 15. The other side of the meter 15 is connected by means of lead 17 to the tube 12.

In operation the frusto conical shaped member 34 is placed in mating relation with the flare 11 and the tube 12 so that as the union 38 is rotated in a clockwise direction such causes a constant pressure to be exerted on the base of the member 34, which in turn causes a constant pressure to be applied between the frusto conical shaped member 34 and the flare 11. From the capacitance measurement produced by the meter the accuracy and uniformity of the flare 11 can be determined.

Obviously, numerous modifications and variations of the present invention are possible in light of the above teachings. It is, therefore, to be understood that within the scope of the appended claims the invention may be practiced otherwise than as specifically described.

What is claimed and desired to be secured by the United States Letters Patent is:

1. An apparatus for testing a flared tube for determining the accuracy and uniformity of a flare on the tube comprising:
   (A) a cone-shaped member constructed of electrically conductive material having an axial bore and nonconductive material lining the bore and the base of the cone;
   (B) said cone-shaped member having a tapering surface which is the complement of the desired flare on said tube;
   (C) a uniformly thin layer of dielectric material carried on said surface of said cone-shaped member;
   (D) said surface of said cone-shaped member being positioned in mating relation with said flare of said tube;
   (E) a shaft extending longitudinally through said axial bore into said tube;
   (F) said shaft having tapering threads on one end thereof;
   (G) an expansion bit carried on the threads of said shaft;
   (H) an abutment carried in fixed connection with said shaft externally of the insulated base of said tube for pressing against said cone-shaped member;
   (I) means for rotating said shaft causing said bit to engage the inner surface of said tube for drawing said cone in positive contact with said flare; and
   (J) a meter including capacitance measuring means connected between said cone-shaped member and said flare;
   (K) whereby the capacitance measurement produced by said meter is indicative of the accuracy and uniformity of the flare.

2. The device as set forth in claim 1, wherein said expansion bit includes:
   (A) a plurality of circumferentially spaced, tongue and groove connected, arcuately shaped sections; and
   (B) the inner surface of said sections having threads thereon for meshing with the threads on said elongated shaft;
   (C) whereby said bit expands for engaging the inner wall of said tube as said shaft is rotated in one direction.

3. The device as set forth in claim 1, wherein said expansion bit is constructed of an arcuately shaped flexible member and wherein said bit expands for engaging the inner wall of said tube as said shaft is rotated in one direction.

4. The device as set forth in claim 1, wherein said expansion bit includes:
   (A) a plurality of circumferentially spaced arcuately shaped sections;
   (B) the inner surface of said sections having threads thereon for meshing with the threads on said elongated shaft; and
   (C) a cylindrical flexible jacket encompassing said sections;
   (D) whereby said sections are moved outwardly causing said jacket to engage the inner wall of said tube as said shaft is rotated in one direction.

References Cited
UNITED STATES PATENTS

| | | | |
|---|---|---|---|
| 2,082,364 | 6/1937 | Store | 324—65 |
| 2,520,394 | 8/1950 | Lutz | 324—65 |
| 2,930,976 | 3/1960 | Hirdler | 324—61 |
| 3,257,591 | 6/1966 | Hardy et al. | 324—61 XR |

RUDOLPH V. ROLINEC, *Primary Examiner.*

E. E. KUBASIEWICZ, *Assistant Examiner.*

U.S. Cl. X.R.

33—174